United States Patent [19]

Malone

[11] Patent Number: 5,672,012
[45] Date of Patent: Sep. 30, 1997

[54] CARGO DECK BEARING

[75] Inventor: Paul Malone, Long Beach, Calif.

[73] Assignee: RBC Transport Dynamics Corporation, Santa Ana, Calif.

[21] Appl. No.: 623,177

[22] Filed: Mar. 28, 1996

[51] Int. Cl.$^6$ ............................ F16C 29/04; B65G 13/00
[52] U.S. Cl. ........................ 384/49; 193/35 MD
[58] Field of Search .......................... 384/49; 193/35 MD

[56] References Cited

U.S. PATENT DOCUMENTS

| | | | |
|---|---|---|---|
| 3,530,967 | 9/1970 | Huber et al. | 384/49 X |
| 4,060,252 | 11/1977 | Mowery | 384/49 X |
| 4,553,795 | 11/1985 | Takagi | 384/49 |
| 4,696,583 | 9/1987 | Gorges | 193/35 MD X |
| 4,946,294 | 8/1990 | Yamada | 384/49 |

FOREIGN PATENT DOCUMENTS

| | | | |
|---|---|---|---|
| 2140059 | 2/1973 | Germany | 193/35 MD |

*Primary Examiner*—Thomas R. Hannon
*Attorney, Agent, or Firm*—Kohn & Associates

[57] ABSTRACT

A cargo deck bearing assembly (8) comprising a housing (10) formed of a lightweight material, and means (14) integral therewith for attaching the housing (10) to an airplane cargo deck. A plurality of cavities (18) are provided in the housing (10) at its upper surface (20), generally arranged in the form of a circle. A generally hemispherical cup (22) is disposed in each of the cavities (18). A plurality of small bearing balls (24) are disposed in a single layer over the inner surface of the cup (22), and a single larger bearing ball (28) is disposed over the layer of small bearing balls (24). A rigid skid plate (30) is affixed to the upper surface (20) of the housing over the bearing balls. The skid plate (30) is provided with a plurality of circular apertures (34), one aperture superposed over each of the larger bearing balls (28). The structure results in a lightweight cargo bearing assembly (8) providing low resistance to movement of cargo bins thereover in any direction.

34 Claims, 1 Drawing Sheet

CARGO DECK BEARING

BACKGROUND OF THE INVENTION

1. Technical Field

The present invention relates to the transfer of cargo containers, and more particularly relates to bearing assemblies utilized in mountings in aircraft to facilitate the rolling of cargo containers into and out of aircraft.

2. Background Art

Air cargo is usually mounted onto pallets or placed into special cargo containers for easy handling during loading and unloading of airplanes and for secure containment during transport. The floors in airplane cargo areas are constructed with built-in cargo deck rollers or caster wheels to facilitate the movement of these pallets and containers. Without such rolling contact bearings, maneuvering cargo would be an extremely difficult task. Moreover, dead weight and component costs are important considerations for all mounted hardware in airplanes.

Airplane cargo decks currently utilize a variety of bearings to facilitate rolling of cargo containers into and out of the aircraft. Two such bearing structures are utilized in aircraft cargo compartments by both the Boeing and McDonnell Douglas aircraft organizations. The conventional design consists of three roller bearings mounted on a base; one of the bearings is a thrust bearing mounted with its axis in the vertical position. The other two are radial bearings mounted with each of their axes in the horizontal position. In this design, the cargo pallet load is carried by the two radial bearings where the contact pressure is generally not a problem. However, the weight of the assembly, and its ability to align easily in the direction of intended pallet motion may not be optimal.

These bearing assemblies are very similar in concept to casters used in shopping carts. Consequently, if the initial position of the thrust bearings is not in the direction of the intended movement of the cargo container, resistance will have to be overcome in order to cause the bearing assembly to align with the movement of the cargo container. Moreover, the inherent cost of the assembly is high.

Weight of the cargo deck bearing is a very important economic factor. The weight of the bearing takes weight away from the useful load carrying ability to generate revenue. Every pound of weight savings is worth up to $500.00 of cost savings/or revenue generating ability to a carrier. The bearing assemblies of the prior art are characterized by:

1. Relatively high weight
2. Relatively high cost, and consequently, high price.
3. Some degree of operational deficiency.

Another bearing structure, known as a "ball transfer", has been used in industry for some time. Such structures typically consist of a load ball, a group of supporting roller balls, and a cupped raceway. These structures usually have a lower load capacity than conventional roller contact bearings and keeping them lubricated is more difficult. Ball transfer units in the past have been found to be unsuitable for use as bearings in airplane cargo decks.

SUMMARY OF THE INVENTION AND ADVANTAGES

According to the present invention, a cargo deck bearing assembly (8) is provided comprising a housing (10) formed of a lightweight material, and means (14) integral thereto for attaching the housing (10) to an airplane cargo deck. A plurality of cavities (18) are provided in the housing (10) at its upper surface (20), generally arranged in the form of a circle. A generally hemispherical cup (22) is disposed in each of the cavities (18). A plurality of small bearing balls (24) are disposed in a single layer over the inner surface of the cup (22), and a single larger bearing ball (28) is disposed over the layer of small bearing balls (24). A rigid skid plate (30) is affixed to the upper surface (20) of the housing over the bearing balls. The skid plate (30) is provided with a plurality of circular apertures (34), one aperture superposed over each of the larger bearing balls (28). The diameter of each of the apertures (34) in the skid plate (30) is smaller than the diameter of each of the larger bearing balls (28) in order to retain them within the cups (22). However, the diameter of the apertures (34) must be sufficiently large to permit a portion of each of the large bearing balls to extend beyond the upper surface of the skid plate (34) in order to engage and support the bottom of cargo bins which roll over the bearings. The structure results in a lightweight cargo bearing assembly (8) providing low resistance to movement of cargo bins thereover in any direction. The structure also meets the established requirements for flammability resistance and static limit load testing.

BRIEF DESCRIPTION OF THE DRAWING

Other advantages of the present invention will be readily appreciated as the same becomes better understood by reference to the following detailed description when considered in connection with the accompanying drawing wherein.

DETAILED DESCRIPTION OF THE PREFERRED EMBODIMENT

Figure 1:
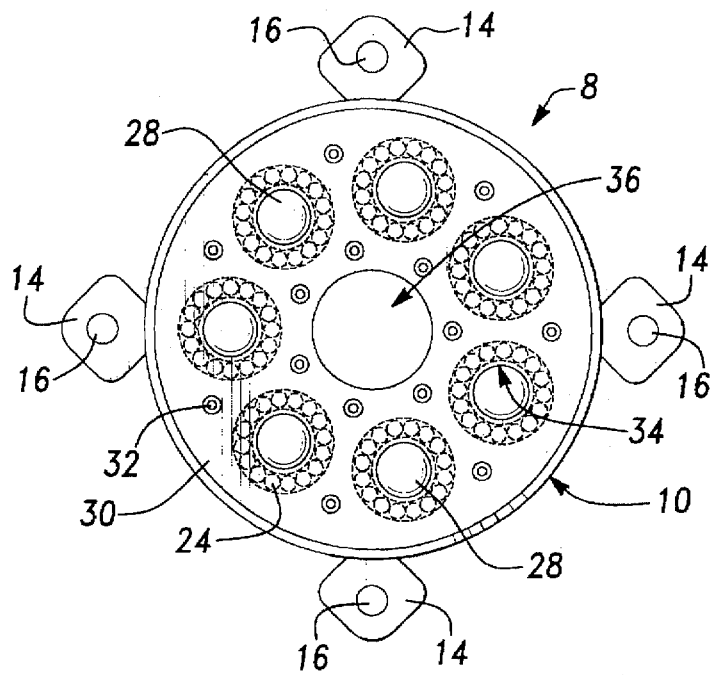
FIG. 1 is a top plan view of the cargo deck bearing assembly (8) of the invention.
Figure 2:
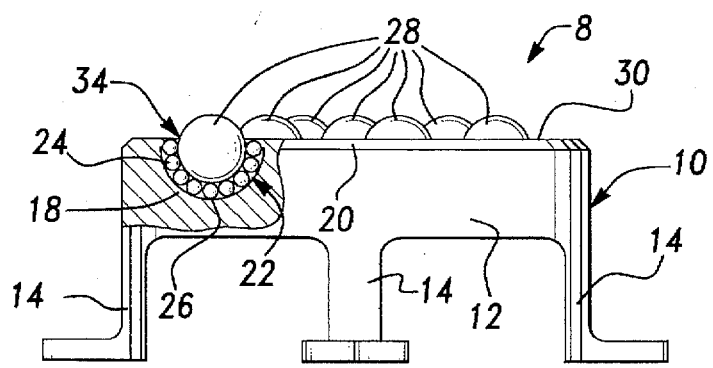
FIG. 2 is a side view, partly in cross-section, of the cargo deck bearing assembly (8) shown in FIG. 1.

Referring to FIGS. 1 and 2, the cargo deck bearing assembly (8) comprises a housing (10) formed of a base plate (12) and means integral therewith in the form of legs (14) having apertures (16) therein for affixing the housing to an airplane cargo deck. A plurality of cavities (18) arranged in a circle are provided in the base plate (12) opening into the upper surface (20) of the base plate (12). The cavities (18) are preferably generally hemispherical in shape, although other forms may be utilized. Cups (22) having a generally hemispherical shape are disposed one in each one of the cavities (18). A plurality of small bearing balls (24) are positioned in a single layer on the inner surface of each one of the cups (22). The small bearing balls (24) are arranged to cover a major portion of the inner surface of each one of the cups (22). A suitable lubricant (26) is contained within each of the cups (22).

Mounted in each cavity (18) and supported by the small bearing balls (24) is a large bearing ball (28). A skid plate (30) is mounted on the upper surface (20) of the base plate (12) and affixed thereto by screws (32) or other suitable means. The skid plate (30) is provided with a plurality of circular apertures (34), one aperture (34) superposed over each one of the large bearing balls (28). The diameter of each aperture (34) must be sufficiently large to permit a portion of the large bearing ball (28) to extend beyond the surface of the skid plate (30) sufficiently to engage and support the bottoms of cargo containers. However, the diameter of each aperture (34) must still be smaller than the diameter of each large bearing ball (28) in order to retain the large and small bearing balls within the space defined by the cup (22) and the skid plate (30).

A small area of the inner surface of each of the cups (22) at the lips thereof is left free of the small bearing balls (24) to permit lateral movement of the small bearing balls (24) when the are forced upwardly by rotation of the large bearing balls (28). The geometry is such that when the small bearing balls (24) are forced upwardly by the movement of the large bearing balls (28), they do not move straight upwardly where they would become trapped against the top cover plate (30), but, instead, when they reach the skid plate (30), they move laterally in the free space provided and recirculate in. A central aperture (36) is provided in the base plate (12) of the housing (10) in order to accomplish a weight reduction in the housing (10).

Figure 3:
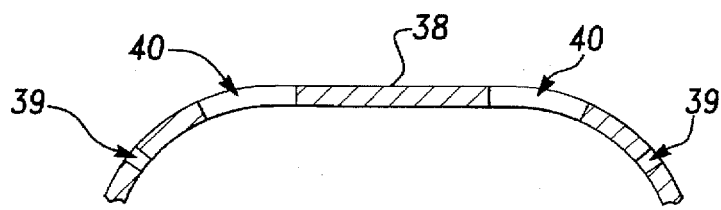
FIG. 3 is a sectional view taken through the axis of an alternative form of a skid plate (30) which may be utilized in the cargo deck bearing (8).

Referring to FIG. 3, an alternative form of a skid plate (38) is shown in sectional view. Instead of being flat, the skid plate (38) is in the form generally of a dome. The skid plate (38) is provided with small apertures (39) to receive screws or other fastening means for affixing the skid plate (38) to the base (12) of a housing (10). The skid plate (38) is also provided with larger apertures (40), each aperture arranged to be placed over one of the large bearing balls (28).

The housing (10) of the present invention may be formulated of any light weight moldable material. Light weight metals such as aluminum or one of its alloys can be used. However, materials such as moldable thermoplastic or thermosetting resins are preferred, since they are lighter, more readily molded to the final form, and have sufficient structural strength. Among the resins which may be utilized are phenol formaldehyde and other combined formaldehyde resins, polyester resins, polycarbonate resins, polyurethane resins, polyepoxy resins, polyamide resins, and any of a large number of other moldable resins. A preferred material is a composition which is formed by first utilizing a commercial product designated as #GF10-42L14 and marketed by Devoe Engineering Corp. This material is stated by the manufacturer to contain from 5% to 20% short glass fibers, 6% to 15% Kraton®, and the balance comprising type 6 nylon NY400, to bring the composition to a complete 100% mixture. Kraton® is a registered trademark of the Shell Chemical Company, and is a styrene-butadiene elastomer. This composition is further compounded by adding thereto 6% to 12% Vydyne® nylon #M344, a registered trademark of Monsanto Chemical Co. This material is stated to be an unreinforced of-white nylon modified with a flame retardant additive. This compounded polyamide composition has been tested and has passed the Federal Aviation Administration flammability test requirement. It has also passed the static limit load test requirement.

The lubricant (26) utilized in lubricating the bearing balls (24,28) may be any suitable lubricant known in the art. A preferred lubricant is Mobilegrease® #20, a registered trademark of the Mobil Oil Corp., which comprises a synthetic grease manufactured from a synthesized hydrocarbon fluid and a Norsoap thickener. A solid film lubricant may also be used, such as Drylub®, a registered trademark of EM Corporation, a subsidiary of Great Lakes Chemical Corporation.

The bearing balls (24,28) can be made of any suitable metal. The preferred material is heat treated stainless steel. The preferred size of the small bearing balls (24) is about ⅛ inch in diameter. The preferred size of the large bearing balls (28) is about ½ inch in diameter.

The skid plate (30) can be formed of any suitable metal. The preferred material is heat treated stainless steel. The preferred shape of the skid plate I(30) is generally dome-shaped, since this prevents baggage containers and pallets from snagging the edges of the skid plate (30).

The cargo deck housing (10) may be fabricated in any desired size. However, when the housing is to be used for airplane cargo decks, the constraints of established usage dictate on one aircraft model the diameter of the present housing (10) to be about 3.5 inches. Although an aperture (36) need not be provided in the housing base (12), it may be advantageously utilized to reduce the weight of the housing (10).

The cavities (18) provided in the base (12) of the housing 14 may be of any suitable shape and of sufficient size to contain the cups (22). Preferably, the cavities should be generally hemispherical.

The cargo deck bearing of the present invention has a number of advantages over those presently utilized in the air transport industry. The present structure has the potential for saving substantial weight over today's conventional designs. This weight saving comes from two specific factors: (1) the combined weight of the ball units required to meet load carrying specifications is less than that of the currently used antifriction bearings and (2) the ball units can effectively be integrated into a light weight housing to form a cargo deck bearing lighter in weight than conventional structures.

The conventional cargo deck structures utilized in the industry do not facilitate the movement of the cargo pallets without considerable pushing effort when the radial bearing pair is not lined up in the direction of the intended motion. Since the structure of the present invention contains ball bearing units which have no directional preference, the movement of the cargo pallet may be easily moved in all directions.

The cost of the cargo deck bearing of the invention is inherently less than that of the conventional structures. The ball bearing units can be manufactured less expensively than the roller bearing units presently utilized. The reason for this lies in the fact that most manufacturing costs are related to the production of the inner and outer races of the bearings (costly grinding operations are involved), as well as their assembly into bearings. The least expensive principal components in a bearing are the balls—which represent virtually all the expense attendant in the manufacture of the present invention. Moreover, the housing of the cargo deck bearing of the present invention may be simply and inexpensively molded from various moldable polymeric resins.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A cargo deck bearing assembly (8) comprising:
   an integral housing (10) including a base (12) and means (14) extending outwardly from said base (12) and adapted to affix said base (12) to a supporting surface;
   a plurality of cavities (18) provided at the upper surface of said base (12);
   a plurality of generally hemispherically shaped cups (22) seated one in each of said cavities (18);

a plurality of bearing balls (24) disposed in a single layer in each of said cups (22);

a plurality of relatively large bearing balls (28), each of said large bearing balls (28) being seated in one of said cups (22) and being supported by said single layer of relatively smaller bearing balls (24);

a rigid skid plate (30) mounted on the upper surface of said base (12), and means (32) affixing said skid plate (30) to said base (12); and a plurality of apertures (34) provided in said skid plate (30), each aperture being superposed over one of said large beating balls (28), the diameter of each of said apertures (34) being sufficiently large to permit a portion of each of said large bearing balls (28) to extend therethrough above the upper surface of said skid plate (30), but smaller than the diameter of each of said large bearing balls (28), thereby containing said large bearing balls (28) and said small bearing balls (24) within said cup (22).

2. A cargo deck bearing assembly (8) according to claim 1, wherein said housing (10) is formed of a light weight metal.

3. A cargo deck bearing assembly (8) according to claim 1, wherein said housing (10) is formed of a thermoplastic resin.

4. A cargo deck bearing assembly (8) according to claim 1, wherein said housing (10) is formed of a thermosetting resin.

5. A cargo deck bearing assembly (8) according to claim 1, wherein said housing (10) is formed of a phenol formaldehyde resin.

6. A cargo deck bearing assembly (8) according to claim 1, wherein said housing (10) is formed of a polyester resin.

7. A cargo deck bearing assembly (8) according to claim 1, wherein said housing (10) is formed of a polycarbonate resin.

8. A cargo deck bearing assembly (8 according to claim 1, wherein said housing (10 is formed of a polyurethane resin.

9. A cargo deck bearing assembly (8 according to claim 1, wherein said housing (10) is formed of a polyepoxy resin.

10. A cargo deck bearing assembly (8) according to claim 1, wherein said housing (10) is formed of a polyamide resin.

11. A cargo deck bearing assembly (8) according to claim 1, wherein said housing (10) is formed of a moldable resin having a plurality of reinforcing fibers dispersed therein.

12. A cargo deck bearing assembly (8) according to claim 11, wherein said reinforcing fibers are glass fibers.

13. A cargo deck bearing assembly (8) according to claim 11, wherein said reinforcing fibers are graphite fibers.

14. A cargo deck bearing assembly (8) according to claim 1, wherein said housing (10) is formed of a composition which includes a polyamide resin, reinforcing glass fibers dispersed therein, and a flame retardant additive.

15. A cargo deck bearing assembly (8) according to claim 1, wherein said means (14) for affixing said base (12) to a supporting surface comprises a plurality of integral legs having apertures provided therein for being affixed to a cargo deck by fastening means.

16. A cargo deck bearing assembly (8) according to claim 1, wherein each of said cavities (18) is generally hemispherical.

17. A cargo deck bearing assembly (8) according to claim 1, wherein each of said cups (22) is formed of steel.

18. A cargo deck bearing assembly (8) according to claim 1, wherein each of said cups (22) is formed of heat treated stainless steel.

19. A cargo deck bearing assembly (8) according to claim 1, wherein each of said large bearing balls (28) is formed of steel.

20. A cargo deck bearing assembly (8) according to claim 1, wherein each of said large bearing balls (28) is formed of heat treated stainless steel.

21. A cargo deck bearing assembly (8) according to claim 1, wherein each of said large bearing balls (28) has a diameter of about 0.5 inch.

22. A cargo deck bearing assembly (8) according to claim 1, wherein each of said small bearing balls (24) is formed of steel.

23. A cargo deck bearing assembly (8) according to claim 1, wherein each of said small bearing balls (24) is formed of heat treated stainless steel.

24. A cargo deck bearing assembly (8) according to claim 23, wherein each of said small bearing balls (24) has a diameter of about 0.125 inch.

25. A cargo deck bearing assembly (8) according to claim 1, wherein said skid plate (30) is formed of steel.

26. A cargo deck bearing assembly (8) according to claim 1, wherein said skid plate (30) is formed of heat treated metal.

27. A cargo deck bearing assembly (8) according to claim 1, wherein said skid plate (30) is dome shaped.

28. A cargo deck bearing assembly (8) according to claim 1, wherein said means (26) for lubricating said bearing balls (24) (28) is a synthetic grease comprised of a synthesized hydrocarbon fluid and a thickener.

29. A cargo deck bearing assembly (8) according to claim 1, wherein an aperture (34) is provided in said base (12) for reducing the weight thereof.

30. A cargo deck bearing assembly (8) according to claim 1, wherein the diameter of the base (12) of said housing (10) is about 3½ inches.

31. A cargo deck bearing assembly (8) according to claim 1, wherein space is provided between the upper edge of the layer of small bearing balls (24) in each cup (21) and said skid plate (30), thereby providing space for permitting lateral movement of the small bearing balls (24) when they are forced upwardly by the rotation of the large bearing ball (28), and thereby permitting the recirculation of the small bearing balls (24).

32. A cargo deck bearing assembly, as set forth in claim 1 further including means (26) disposed within each of said cups (22) for lubricating said large bearing balls (28) and said small bearing balls (24).

33. A cargo deck bearing assembly (8) according to claim 32, wherein said means (26) for lubricating said bearing balls (24) (28) is a water resistant grease.

34. A cargo deck bearing assembly (8) according to claim 32, wherein said means (26) for lubricating said bearing balls (24) (28) is a solid film lubricant containing molybdenum disulfide and graphite.

* * * * *